(12) United States Patent
Jones

(10) Patent No.: US 6,464,015 B1
(45) Date of Patent: Oct. 15, 2002

(54) LAWN EDGER CUTTING AND MULCHING ATTACHMENT

(76) Inventor: J. Thomas Jones, 1210 Red Roan La., Loveland, OH (US) 45140

( * ) Notice: Subject to any disclaimer, the term of this patent is extended or adjusted under 35 U.S.C. 154(b) by 0 days.

(21) Appl. No.: 09/912,989

(22) Filed: Jul. 25, 2001

(51) Int. Cl.$^7$ ............................................. A01B 45/00
(52) U.S. Cl. ........................................... 172/15; 56/256
(58) Field of Search ..................... 56/255, 256; 172/13, 172/15, 17; 30/276

(56) References Cited

U.S. PATENT DOCUMENTS

| | | | |
|---|---|---|---|
| 2,312,569 A | * 3/1943 | Maga | 56/256 |
| 2,737,105 A | * 3/1956 | Wilson | 172/15 |
| 2,745,331 A | * 5/1956 | Lancour | 172/15 |
| 2,913,058 A | * 11/1959 | Smith et al. | 172/15 |
| 3,093,195 A | 6/1963 | Roberts | |
| 3,319,365 A | * 5/1967 | Perry et al. | 172/15 |
| 3,590,926 A | 7/1971 | Tepers | |
| 3,656,555 A | 4/1972 | Johns, Sr. | |
| 3,684,027 A | 8/1972 | Crawford | |
| 4,072,195 A | 2/1978 | Carlson | |
| 4,653,590 A | 3/1987 | Shank | |
| 6,092,608 A | 7/2000 | Leger | |

FOREIGN PATENT DOCUMENTS

GB          2045046          10/1980

* cited by examiner

Primary Examiner—Robert E. Pezzuto
(74) Attorney, Agent, or Firm—Bullwinkel Partners, Ltd.

(57) ABSTRACT

A cutting and mulching attachment for a lawn edger that creates a clean edge to a landscaped area. The attachment comprises a flat, circular cutting blade and two or more flat mulching blades extending laterally from the cutting blade. Each mulching blade has a toothed edge that faces in the direction of the cutting blade rotation. The plane of each mulching blade defines an acute angle with respect to the plane of the cutting blade. The teeth of one mulching blade are offset from the teeth of the other mulching blade so that, as each mulching blade sweeps through the turf, its teeth remove any ridges of turf left behind by the teeth of the other blade.

6 Claims, 4 Drawing Sheets

LAWN EDGER CUTTING AND MULCHING ATTACHMENT

BACKGROUND

1. Field of the Invention

This patent relates to a lawn and gardening tool. More specifically, this patent relates to a cutting and mulching blade that attaches to the end of an edging machine for cutting a fresh edge in the turf surrounding a landscaped area and mulching the freshly cut portion of the turf.

2. Description of the Related Art

Lawn edging machines are used to cut a trench between a lawn and a sidewalk or around the periphery of a landscaped area. When used to cut a trench around a landscaped area, conventional edging machines simply cut a groove in the turf about a half-inch away from the periphery of the area. It is then necessary to remove the narrow slice of turf with a spade to form a new edge. The landscaped area can then be mulched, if desired.

There is a need for an edger that can both cut a groove around a landscaped area and remove the narrow slice of turf defined by the new edge at the same time. The purpose of the present invention is to provide a cutting blade attachable to a lawn edger that can perform these two functions.

SUMMARY OF THE INVENTION

The present invention is a cutting and mulching attachment for a lawn edger that creates a clean edge to a landscaped area. The attachment can be used with high speed edging machines or any suitable edging machine and can be manufactured to attach to either side of the machine. The attachment comprises a flat, circular cutting blade and two or more flat mulching blades extending laterally from the cutting blade. The cutting blade has a centrally disposed hole for accommodating a shaft, and teeth extending from the periphery of the cutting blade.

Each mulching blade has a toothed edge that faces in the direction of the cutting blade rotation. The plane of each mulching blade defines an acute angle with respect to the plane of the cutting blade, optimally 68 degrees. The plane of each mulching blade is radially aligned with the centrally disposed hole of the cutting blade.

Significantly, the teeth of one mulching blade are offset from the teeth of the other mulching blade so that, as each mulching blade sweeps through the turf, its teeth remove any ridges of turf left behind by the teeth of the other blade. In the preferred embodiment, the mulching blades are punched out of the cutting blade such that the cutting blade and mulching blades are of constructed of the same piece of material.

THE DRAWINGS

DETAILED DESCRIPTION OF THE INVENTION

Figure 1:
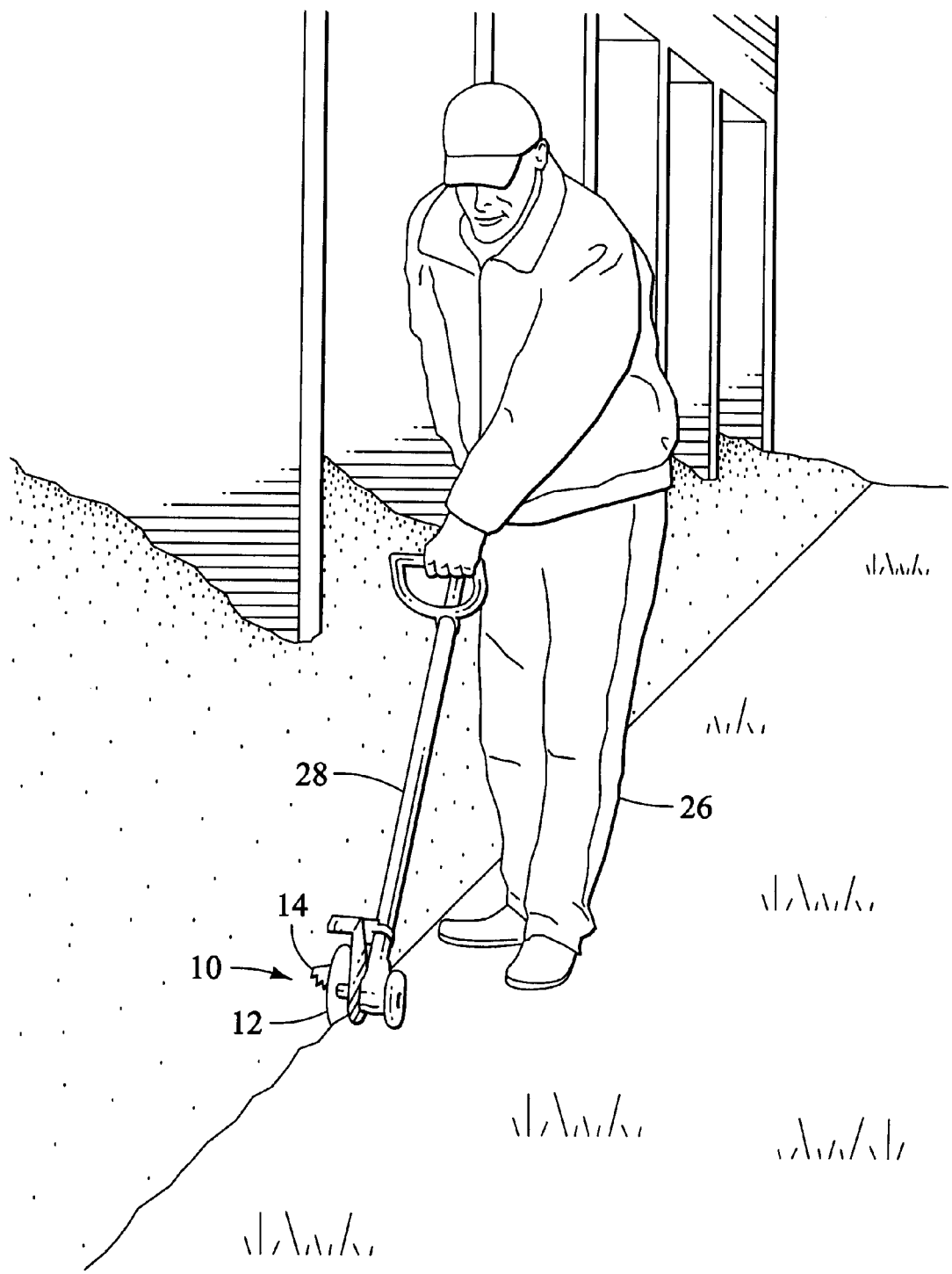
FIG. 1 is a perspective view of a lawn edger with a cutting and mulching attachment according to the present invention shown in use.

Turning to the drawings, there is shown in FIGS. 1–5 one embodiment of the present invention, a cutting and mulching blade that attaches to the end of a conventional lawn edging machine for cutting a fresh edge in the turf surrounding a landscaped area or for cutting an edge adjacent a paved surface such as a sidewalk. The cutting blade can both cut the fresh edge and remove the thin slice of turf created by the cutting process.

As shown in the drawings, the attachment 10 comprises a rotatable cutting blade 12 and two or more mulching blades or ribs 14 attached to the cutting blade 12. The cutting blade 12 cuts a groove in the turf to form a narrow strip of turf between a lawn and a landscaped area, and the mulching ribs 14 pulverize the narrow strip of turf and kicks the pulverized turf (debris) up out of the trench and onto the landscaped area. The debris is discharged to rear of the attachment 10 on the landscaped area side.

Figure 2:
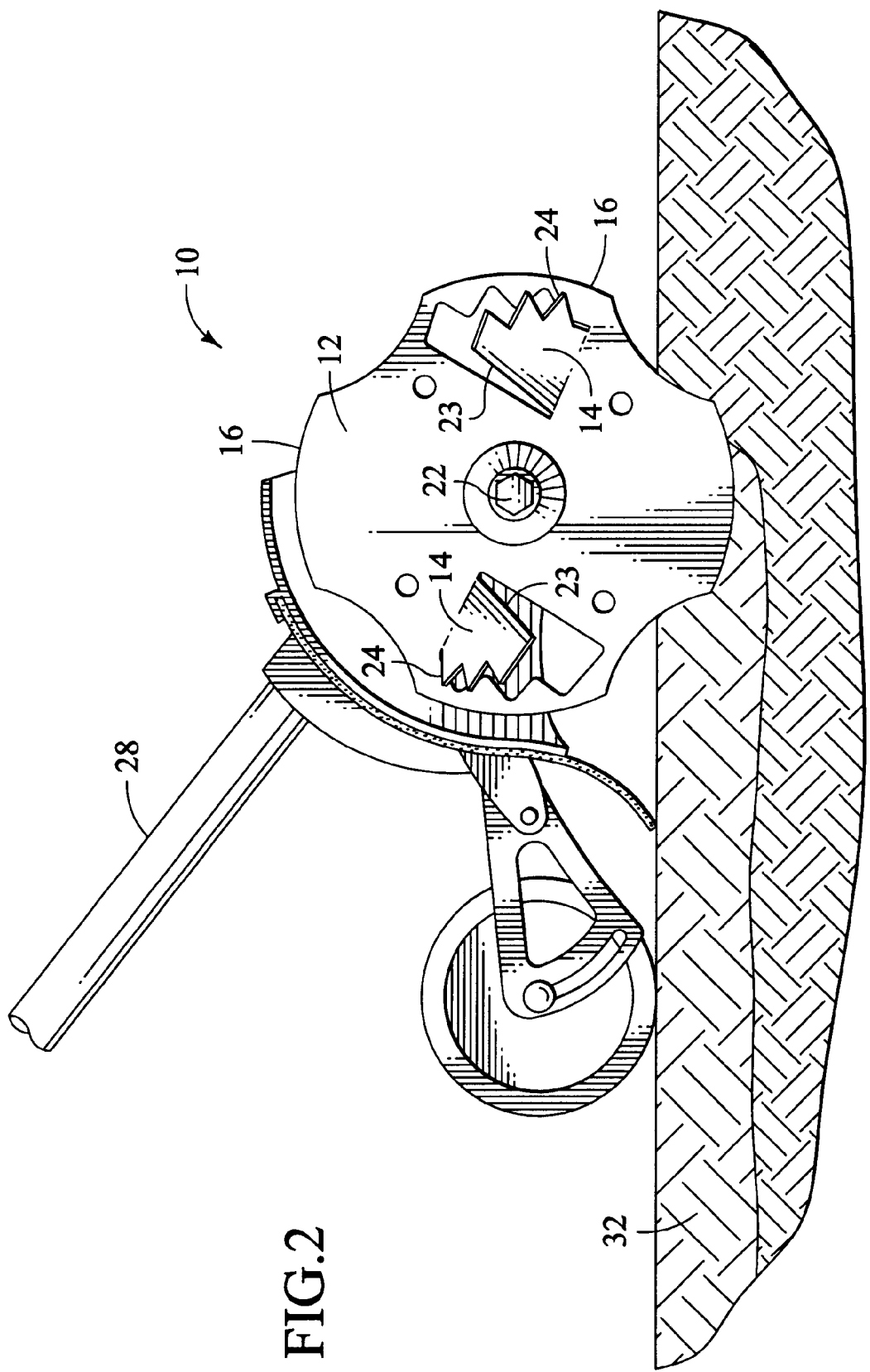
FIG. 2 is a partial side elevation view of the lawn edger with a cutting and mulching attachment shown in FIG. 1.
Figure 3:
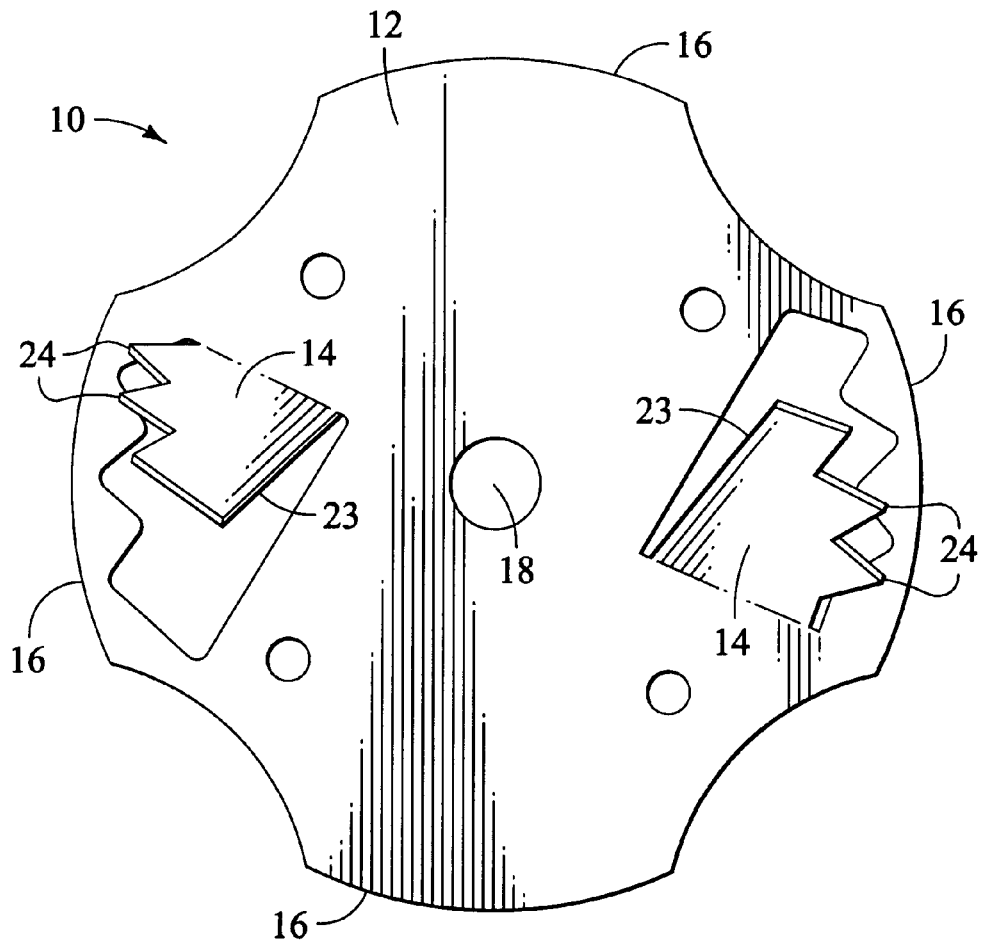
FIG. 3 is a side elevation view of a cutting and mulching attachment according to the present invention.
Figure 4:
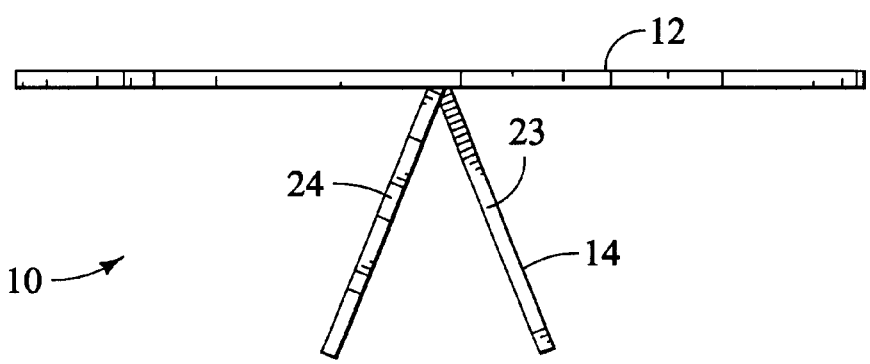
FIG. 4 is a top view of the cutting and mulching attachment of FIG. 3 after it has been partially rotated.

As best shown in FIGS. 2 and 3, the cutting blade 12 is substantially circular and substantially planar, with cutting teeth 16 extending radially from its perimeter. The cutting blade 12 is provided with a centrally disposed hole 18 to accommodate an edger drive shaft 22.

The mulching blades 14 are also substantially planar. In the illustrated embodiment, the mulching blades 14 extend from the plane of the cutting blade 12 and form an acute angle with respect to the cutting blade 12. The angle formed preferably is between about 60 and 75 degrees, and optimally is 68 degrees.

Preferably, the mulching blades are punched out of the cutting blade 12 such that the cutting blade 12 and mulching blades 12 are of unitary construction, as shown in the figures. Alternatively, the mulching blades 14 may be bolted onto the cutting blade 12, spot-welded thereto, or both. If the mulching blades are punched out of the cutting blade 12, it is suggested that the distance from the edge of the cutting blade 12 to the opening left by the mulching blades 14 be at least ¼ inch for strength purposes.

Figure 5:
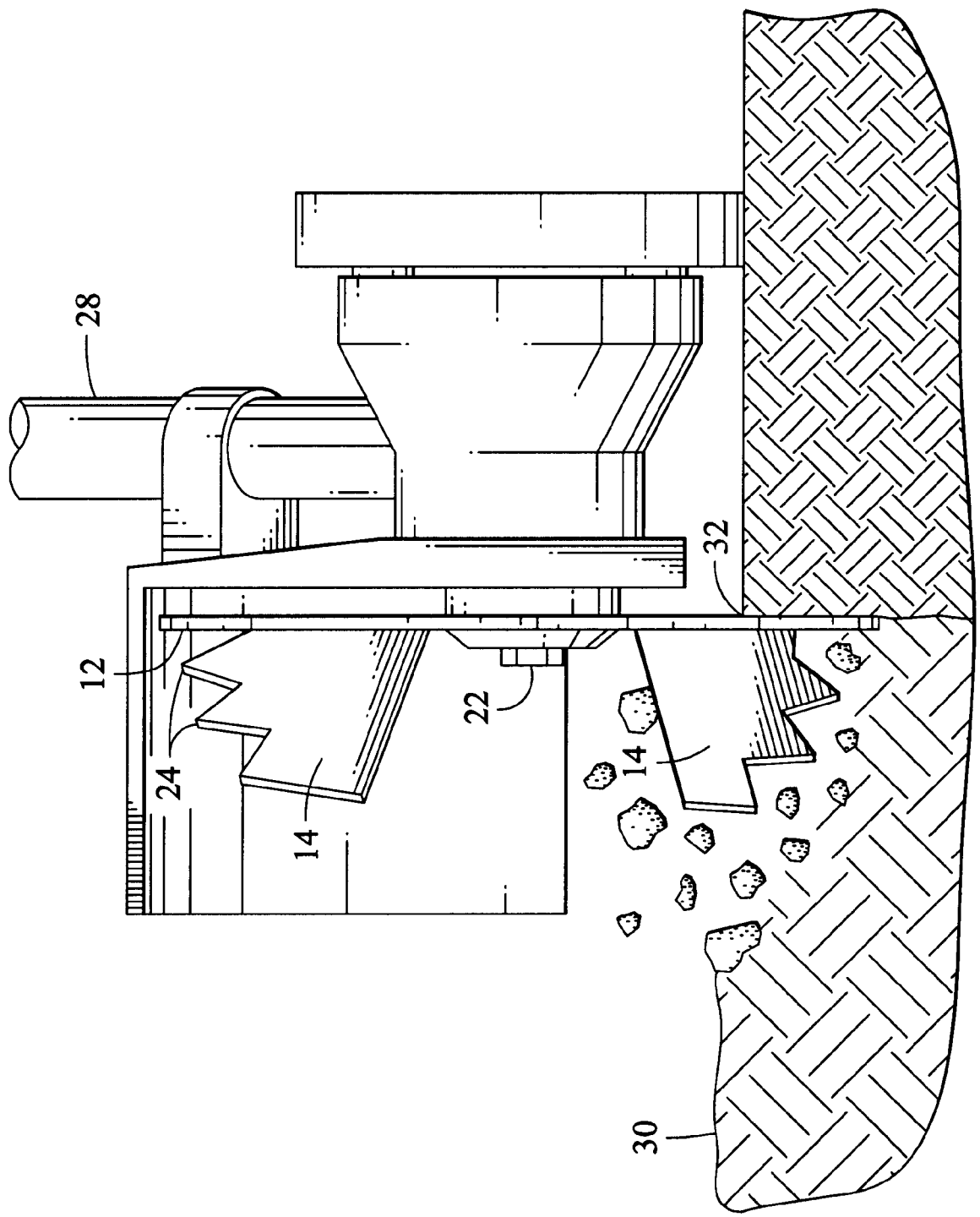
FIG. 5 is a partial front elevation view of the lawn edger with cutting and mulching attachment of FIG. 1.

As best shown in FIGS. 3 and 5, each mulching blade 14 has a rearward facing or following edge 23 and an edge having teeth 24 that face the turf as the blades 14 rotate. Each mulching blade 14 is roughly the shape of a right triangle, with the toothed edge 24 as the hypotenuse. An optional cylindrical hub (not shown in the figures) may be disposed around the centrally disposed hole 22 and attached to the following edges 23 of the mulching blades 14 to provide extra support for the mulching blades 14.

Preferably, the teeth 24 of one blade 14 are offset (complementary) with respect to the teeth 24 of the other blade 14 so that, as each blade 14 sweeps through the turf, its teeth 24 remove all or substantially all of the ridges of turf left behind by the teeth 24 of the preceding blade 14. In other words, the teeth 24 of each mulching blade 14 rotate through the spaces defined by the gaps in the teeth 24 of the other mulching blade 14.

The embodiment illustrated in the figures has two opposing mulching blades 14 whose planes are radially aligned with the central hole 18. However, other configurations are anticipated that fall within the scope of the invention. For instance, the planes of the blades need not be aligned with the central hole, but can be offset therefrom. Also, there need not be only two mulching blades, although two is preferred.

The invention works in the following manner. The cutting and mulching blade 10 may be attached to a conventional high-speed stick edger machine 28 as shown in FIG. 1 or with any suitable edging machine. As the operator 26 runs the edger machine 28 along the edge of a landscaped area 30, the rotating cutting blade 12 cuts a fresh edge 32, leaving a thin strip of turf. As the cutting blade 12 rotates, a first mulching blade 14 cuts through the thin strip of turf, pulverizing it and lifting it out of the newly created trench and throwing the pulverized turf back and onto the landscaped area where it can be left or removed. Due to the toothed edge 24 of the mulching blades 14, the first mulching blade 14 may leave behind narrow ridges of turf that can then be scooped up and pulverized by the next, following mulching blade 14, leaving a neat, clean edge to the landscaped area.

Thus there has been described a cutting and mulching blade that can be attached to a conventional edging machine to create a clean edge to a landscaped area. The attachment can be used with high speed edging machines, i.e. edging machines operating at speeds up to 8,000 RPM, and can be manufactured to attach to either side of the machine. The blade can be stamped out of a single piece of material to reduce manufacturing costs.

Other modifications and alternative embodiments of the invention are contemplated which do not depart from the spirit and scope of the invention as defined by the foregoing teachings and appended claims. It is intended that the claims cover all such modifications that fall within their scope.

I claim as my invention:

1. A cutting and mulching attachment for a lawn edger, the attachment comprising:

a substantially planar, substantially circular, rotatable cutting blade having cutting teeth extending from the periphery of the cutting blade and a centrally disposed hole for accomodating a shaft; and at least two substantially planar mulching blades extending from the plane of the cutting blade, each mulching blade having a saw-toothed edge that faces in the direction of the cutting blade rotation, the plane of each mulching blade defining an acute angle with respect to the plane of the cutting blade.

2. The cutting and mulching attachment of claim 1 wherein the plane of each mulching blade is radially aligned with the centrally disposed hole.

3. The cutting and mulching attachment of claim 2 wherein the plane of each mulching blade defines an angle of between about 60 and 75 degrees with respect to the plane of the cutting blade.

4. The cutting and mulching attachment of claim 2 wherein the plane of each mulching blade defines an angle of about 68 degrees with respect to the plane of the cutting blade.

5. The cutting and mulching attachment of claim 1 wherein the saw-teeth of one mulching blade are offset from the saw-teeth of another mulching blade such that, as each mulching blade sweeps through space, the saw-teeth of one mulching blade define gaps through which the teeth of the other mulching blade sweep.

6. A cutting and mulching attachment for a lawn edger, the attachment comprising:

a substantially planar, substantially circular, rotatable cutting blade having cutting teeth extending from the periphery of the cutting blade and a centrally disposed hole for accommodating a shaft; and two substantially planar mulching blades extending from the plane of the cutting blade, each mulching blade having a saw-toothed edge that faces in the direction of the cutting blade rotation, the plane of each mulching blade defining an acute angle with respect to the plane of the cutting blade, the plane of each mulching blade being radially aligned with the centrally disposed hole, the saw-teeth of one mulching blade being offset from the saw-teeth of the other mulching blade.

* * * * *